United States Patent
Zhang et al.

(10) Patent No.: US 11,089,288 B2
(45) Date of Patent: Aug. 10, 2021

(54) CORNER POINT EXTRACTION SYSTEM AND METHOD FOR IMAGE GUIDED STEREO CAMERA OPTICAL AXES ALIGNMENT

(71) Applicant: TuSimple, Inc., San Diego, CA (US)

(72) Inventors: Bolun Zhang, San Diego, CA (US); Yi Wang, San Diego, CA (US); Ke Xu, San Diego, CA (US)

(73) Assignee: TUSIMPLE, INC., San Diego, CA (US)

(*) Notice: Subject to any disclaimer, the term of this patent is extended or adjusted under 35 U.S.C. 154(b) by 170 days.

(21) Appl. No.: 15/701,398

(22) Filed: Sep. 11, 2017

(65) Prior Publication Data

US 2019/0082156 A1 Mar. 14, 2019

(51) Int. Cl.
*H04N 13/246* (2018.01)
*G06T 7/13* (2017.01)
(Continued)

(52) U.S. Cl.
CPC ......... *H04N 13/246* (2018.05); *G05D 1/0248* (2013.01); *G06T 7/13* (2017.01);
(Continued)

(58) Field of Classification Search
CPC ...... G05D 1/0248; G05D 1/0088; G06T 7/80; G06T 7/85; G06T 7/13; G06T 2200/04;
(Continued)

(56) References Cited

U.S. PATENT DOCUMENTS 8,212,878 B2* 7/2012 Shima ................. G06T 7/80
348/207.99
8,264,546 B2* 9/2012 Witt ................. G06T 7/74
348/187

(Continued)

FOREIGN PATENT DOCUMENTS

CN 103714535 A 4/2014
EP 1087626 A2 * 3/2001 ......... G06K 9/00798

(Continued)

OTHER PUBLICATIONS

Wang et al, Camera Calibration by Vanishing Lines for 3-D Computer Vision, IEEE Transactions on Pattern Analysis and Machine Intelligence, vol. 13, No. 4, pp. 370-376. Apr. 1991. (Year: 4199).*

(Continued)

*Primary Examiner* — David E Harvey
(74) *Attorney, Agent, or Firm* — Paul Liu; Julie J. Muyco; Perkins Coie, LLP

(57) ABSTRACT

A method of aligning optical axes of cameras for a non-transitory computer readable storage medium storing one or more programs is disclosed. The one or more programs comprise instructions, which when executed by a computing device, cause the computing device to perform by one or more autonomous vehicle driving modules execution of processing of images using the following steps comprising: calibrating intrinsic parameters of a set of cameras; extracting corner points associated with a pattern; and computing a vanishing point based on information on the extracted corner points.

18 Claims, 5 Drawing Sheets

(51) Int. Cl.
  *G05D 1/02* (2020.01)
  *G06T 7/80* (2017.01)
  *H04N 13/00* (2018.01)
  *G05D 1/00* (2006.01)

(52) U.S. Cl.
  CPC ............ *G06T 7/85* (2017.01); *G05D 1/0088* (2013.01); *G05D 2201/0213* (2013.01); *G06T 2200/04* (2013.01); *G06T 2207/10012* (2013.01); *G06T 2207/10028* (2013.01); *G06T 2207/30208* (2013.01); *G06T 2207/30252* (2013.01); *H04N 2013/0074* (2013.01)

(58) Field of Classification Search
  CPC . G06T 2207/10012; G06T 2207/30208; G06T 2207/10028; H04N 13/0246; H04N 2013/0074; H04N 13/246
  See application file for complete search history.

(56) References Cited

U.S. PATENT DOCUMENTS

| | | | |
|---|---|---|---|
| 9,081,385 B1 | 7/2015 | Ferguson et al. | |
| 9,357,208 B2* | 5/2016 | Gupta | H04N 17/00 |
| 9,412,168 B2* | 8/2016 | Shimizu | G06K 9/00798 |
| 9,503,677 B1* | 11/2016 | Ramaswamy | H04N 7/00 |
| 9,503,703 B1* | 11/2016 | Ramaswamy | H04N 13/246 |
| 9,569,685 B2* | 2/2017 | Jung | G06K 9/46 |
| 9,865,045 B2* | 1/2018 | El Dokor | G06T 7/187 |
| 10,202,077 B2* | 2/2019 | Gupta | G06T 7/80 |
| 10,339,390 B2* | 7/2019 | Shen | G06K 9/00791 |
| 2003/0103650 A1* | 6/2003 | Otsuka | G06K 9/00798 382/104 |
| 2003/0151665 A1* | 8/2003 | Uchiyama | G06T 7/80 348/187 |
| 2003/0156751 A1* | 8/2003 | Lee | H04N 13/111 382/154 |
| 2004/0095385 A1* | 5/2004 | Koo | G06T 15/20 715/757 |
| 2004/0096082 A1* | 5/2004 | Nakai | G06T 7/593 382/104 |
| 2004/0104935 A1* | 6/2004 | Williamson | G06T 15/20 715/757 |
| 2005/0196034 A1* | 9/2005 | Hattori | G06K 9/00805 382/154 |
| 2005/0237385 A1* | 10/2005 | Kosaka | G01B 11/00 348/42 |
| 2007/0165108 A1* | 7/2007 | Yuasa | B60R 1/00 348/148 |
| 2007/0225933 A1* | 9/2007 | Shimomura | G06K 9/00791 702/127 |
| 2007/0291125 A1* | 12/2007 | Marquet | H04N 13/204 348/207.99 |
| 2008/0007619 A1* | 1/2008 | Shima | G06T 7/80 348/118 |
| 2008/0031514 A1* | 2/2008 | Kakinami | G06T 7/80 382/154 |
| 2008/0240612 A1* | 10/2008 | Liang | G06T 7/85 382/284 |
| 2008/0292131 A1* | 11/2008 | Takemoto | H04N 13/246 382/100 |
| 2009/0003688 A1* | 1/2009 | Chaffey | G06T 3/4038 382/154 |
| 2009/0041337 A1* | 2/2009 | Nakano | G06K 9/00798 382/154 |
| 2009/0153669 A1* | 6/2009 | Kim | G06T 7/593 348/187 |
| 2010/0134516 A1* | 6/2010 | Cooper | G06T 19/006 345/592 |
| 2010/0134634 A1* | 6/2010 | Witt | G06T 7/74 348/181 |
| 2010/0134688 A1* | 6/2010 | Moriwake | G06T 7/80 348/586 |
| 2010/0208034 A1* | 8/2010 | Chen | H04N 13/239 348/46 |
| 2011/0311130 A1 | 12/2011 | Ichimori | |
| 2012/0038748 A1* | 2/2012 | Lindgren | B60R 1/00 348/47 |
| 2012/0133780 A1* | 5/2012 | Zhang | H04N 17/002 348/187 |
| 2012/0314070 A1 | 12/2012 | Zhang et al. | |
| 2013/0038734 A1* | 2/2013 | Furukawa | H04N 7/18 348/148 |
| 2013/0286221 A1* | 10/2013 | Shechtman | G06T 5/00 348/187 |
| 2014/0043473 A1* | 2/2014 | Gupta | H04N 17/00 348/135 |
| 2014/0118503 A1 | 5/2014 | Luo | |
| 2014/0118557 A1* | 5/2014 | Lee | H04N 17/002 348/175 |
| 2014/0184799 A1* | 7/2014 | Kussel | G01B 11/272 348/148 |
| 2015/0049193 A1* | 2/2015 | Gupta | H04N 17/002 348/148 |
| 2015/0145965 A1* | 5/2015 | Livyatan | B60R 1/00 348/47 |
| 2015/0160539 A1* | 6/2015 | Bassi | G06T 7/80 353/69 |
| 2015/0381902 A1* | 12/2015 | Bao | H04N 7/147 348/14.07 |
| 2016/0214535 A1 | 7/2016 | Penilla | |
| 2017/0032526 A1* | 2/2017 | Gao | G06T 7/246 |
| 2017/0177951 A1 | 6/2017 | Yang et al. | |
| 2017/0185851 A1* | 6/2017 | Jeromin | H04N 13/239 |
| 2017/0277197 A1* | 9/2017 | Liao | G06T 7/20 |
| 2017/0347030 A1* | 11/2017 | Guerreiro | H04N 5/23238 |
| 2017/0359573 A1* | 12/2017 | Kim | H04N 5/2256 |
| 2017/0372449 A1* | 12/2017 | Yarvis | G06T 7/12 |
| 2018/0056873 A1* | 3/2018 | Lee | G06T 3/60 |
| 2018/0108150 A1* | 4/2018 | Curtis | G06T 7/593 |
| 2018/0165833 A1* | 6/2018 | Inoue | G01C 25/00 |
| 2018/0324415 A1* | 11/2018 | Bovyrin | G06K 9/00818 |
| 2018/0357791 A1* | 12/2018 | Dworakowski | G06T 7/73 |
| 2018/0365859 A1* | 12/2018 | Oba | H04N 5/232 |
| 2019/0017819 A1* | 1/2019 | Ohara | G06T 7/593 |
| 2019/0082156 A1* | 3/2019 | Zhang | G06T 7/13 |
| 2019/0139319 A1* | 5/2019 | Eisenmann | G06T 19/20 |
| 2019/0147622 A1* | 5/2019 | Li | G01C 11/08 382/154 |
| 2020/0051282 A1* | 2/2020 | Watanabe | H04N 13/239 |
| 2020/0110947 A1* | 4/2020 | Nakayama | G08G 1/16 |

FOREIGN PATENT DOCUMENTS

| | | | | |
|---|---|---|---|---|
| EP | 1087626 A2 | | 3/2001 | |
| EP | 3086284 A1 | * | 10/2016 | ......... G06K 9/00791 |
| EP | 3174007 A1 | * | 5/2017 | ............... G06T 7/73 |
| JP | 2001160137 A | | 6/2001 | ......... G06K 9/00805 |
| TW | 201102752 A | * | 1/2011 | |
| TW | 201102752 A | | 1/2011 | |
| WO | WO-2012145818 A1 | * | 11/2012 | ............... B60R 1/00 |
| WO | 2016090282 A1 | | 6/2016 | |
| WO | WO2016/090282 | | 6/2016 | |
| WO | WO-2018103407 A1 | * | 6/2018 | ............... B64F 5/60 |

OTHER PUBLICATIONS

Broggi et al, "Self-Calibration of a Stereo Vision System for Automotive Applications", Proceedings of the 2001 IEEE International Conferences on Robotics & Automation, Seoul Korea May 21-26, 2001 (Year: 2001).*

Andreas Schindler et al., Generation of High Precision Digital Maps using Circular Arc Splines, 2012 IEEE Intelligent Vehicles Symposium, Spain, Jun. 3-7, 2012.

Written Opinion of the International Searching Authority for corresponding PCT/US2018/047608.

International Search Report for corresponding PCT/US2018/047608.

(56) References Cited

OTHER PUBLICATIONS

Image Guided Stereo Camera Optical Axes Alignment, [date not available].

Zhengyou Zhang, A Flexible New Technique for Camera Calibration, Technical Report MSR-TR-98-71, Dec. 2, 1998, pp. 2-21, Microsoft Research, Redmond, WA.

B. Caprille and V. Torre, "Using Vanishing Points for Camera Calibration." The International Journal of Computer Vision, 4(2): 127-140, Mar. 1990.

Chinese Office Action for Chinese Patent Application No. 201810688782.0, dated May 8, 2020.

Wang, Z., et al., "Recognition and location of the internal corners of planar checkerboard calibration pattern image", Applied Mathematics and Computation, vol. 185, Issue 2, 894-906.

Zhang, Z., "A flexible new technique for camera calibration", IEEE Transactions on Pattern Analysis and Machine Intelligence, 22(11), 1330-1334.

USPTO Final Office Action for U.S. Appl. No. 15/701,409, dated Jan. 6, 2021 (16 pages).

\* cited by examiner

CORNER POINT EXTRACTION SYSTEM AND METHOD FOR IMAGE GUIDED STEREO CAMERA OPTICAL AXES ALIGNMENT

PRIORITY/RELATED DOCUMENTS

This patent application incorporates by reference in their entireties and is related to the co-pending U.S. patent application Ser. No. 15/701,409, filed on Sep. 11, 2017, titled "Vanishing Point Computation and Online Alignment System and Method for Image Guided Stereo Camera Optical Axes Alignment," published as U.S. 2019-0080478.

FIELD OF THE DISCLOSURE

The field of the disclosure is in general related to autonomous vehicles and, in particular, to a system and a method for corner point extraction system and method for image guided stereo camera optical axes alignment.

BACKGROUND OF THE DISCLOSURE

In calibration of a vision system which consists of two or more cameras, an essential step is the evaluation of the geometry of the cameras. In particular, the geometrical properties of an imaging process within a single camera (intrinsic parameters), of the rotation matrix R, and of the translation vector T between pairs of cameras (extrinsic parameters). The accuracy of the measurements of these quantities is essential for a full exploitation of the epipolar constraint and for an accurate reconstruction of 3D data. The intrinsic and extrinsic parameters of a stereo system may be evaluated by using optical calibration without using direct mechanical measurements. Optical calibration allows the reconstruction of camera geometry by simply viewing a suitable calibrating pattern without using direct measurements, which are impractical in many real environments.

All referenced patents, applications and literatures throughout this disclosure, for example, including the following references, are incorporated herein by reference in their entirety:

Z. Zhang, "A flexible new technique for camera calibration," IEEE Transactions on Pattern Analysis and Machine Intelligence, 22(11):1330-1334, 2000.

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a method of aligning optical axes of cameras for a non-transitory computer readable storage medium storing one or more programs. The one or more programs comprise instructions, which when executed by a computing device, cause the computing device to perform by one or more autonomous vehicle driving modules execution of processing of images from a camera and data from a LiDAR using the following steps comprising: calibrating intrinsic parameters of a set of cameras; extracting corner points associated with a pattern; and computing a vanishing point based on information on the extracted corner points.

In an embodiment, the method further comprises: adjusting the set of cameras to align their optical axes in parallel with each other based on the vanishing point.

In another embodiment, the pattern includes a checkerboard pattern.

In yet another embodiment, calibrating a camera comprises: disposing multiple patterns at different orientations in a scene; and obtaining a single image of the multiple patterns.

In still another embodiment, calibrating a camera comprises: disposing a single pattern at different orientations in a scene; and obtaining an image of the single pattern at each of the orientations.

In yet still another embodiment, calibrating a camera comprises: obtaining an image of a planar pattern including corners; recovering from the image the corners of the planar pattern and assigning 3D positions to the recovered corners; and calibrating the set of cameras based on correspondences of corner locations between a 2D pixel coordinate and the 3D positions.

In still yet another embodiment, extracting corner points comprises: disposing the pattern in a scene viewable to the set of cameras; and recovering boundary corner points of the pattern from a pair of images.

In a further embodiment, computing a vanishing point comprises: constructing a pair of parallel lines based on 2D positions of the recovered boundary corner points.

In another further embodiment, the method further comprises: constructing the pair of parallel lines by connecting a pair of recovered boundary corner points on a same side of the pattern.

Embodiments of the present disclosure also provide a system for aligning optical axes of cameras. The system includes an Internet server that further includes an I/O port, configured to transmit and receive electrical signals to and from a client device; a memory; one or more processing units; and one or more programs stored in the memory and configured for execution by the one or more processing units, the one or more programs including instructions by one or more autonomous vehicle driving modules execution of processing of images for: calibrating intrinsic parameters of a set of cameras; extracting corner points associated with a pattern; and computing a vanishing point based on information on the extracted corner points.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
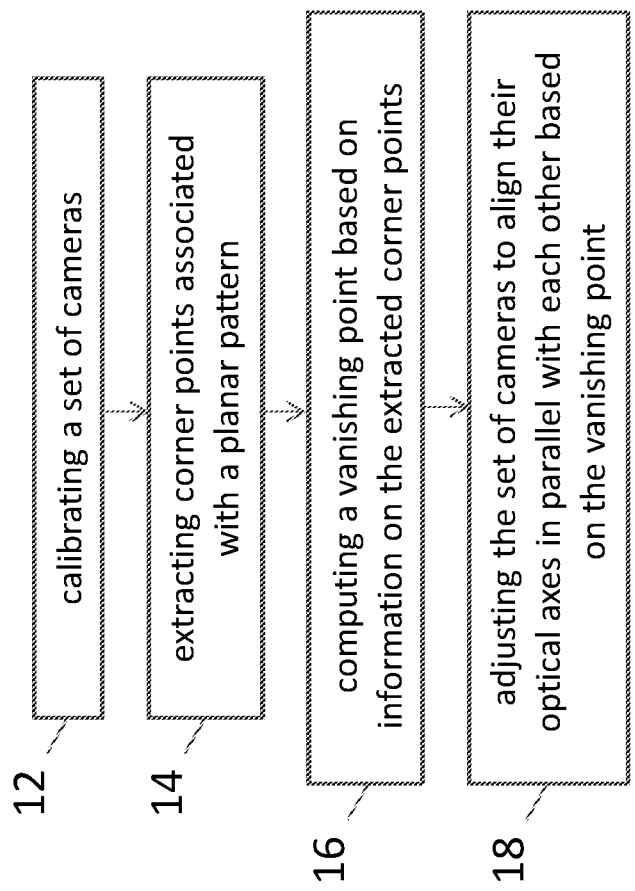
FIG. 1 is a flow diagram showing a method of aligning optical axes of cameras, in accordance with an embodiment.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices. Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

FIG. 1 is a flow diagram showing a method 10 of aligning optical axes of cameras, in accordance with an embodiment.

Figure 5:
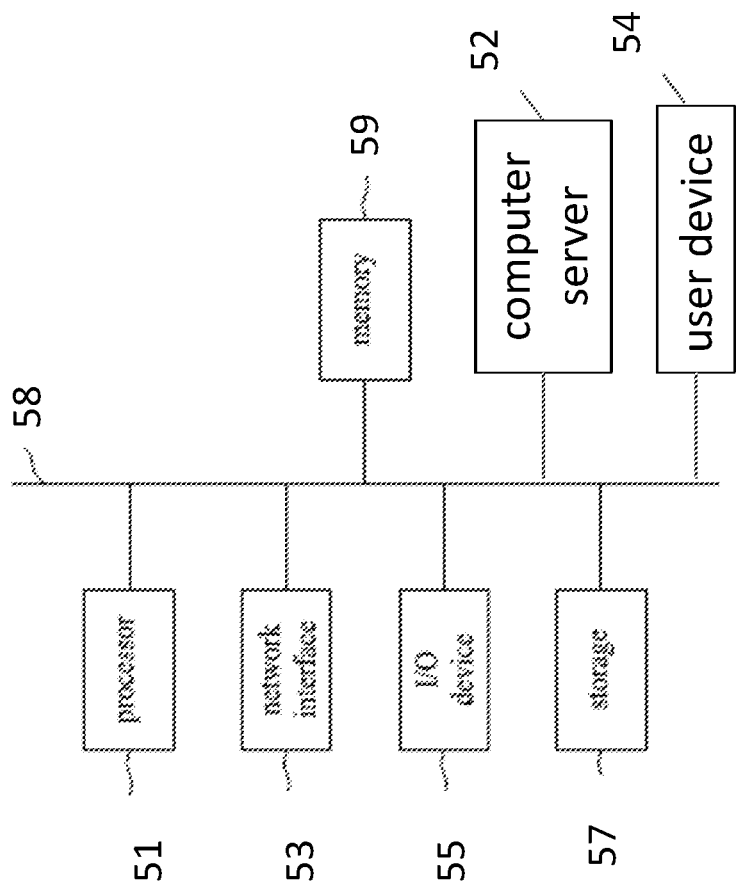
FIG. 5 is a block diagram of a system for aligning optical axes of cameras, in accordance with an embodiment.

In some embodiments in accordance with the present disclosure, a non-transitory, i.e., non-volatile, computer readable storage medium such as memory 59 illustrated in FIG. 5, is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a user device 54 (see FIG. 5). For example, the user device 54 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

In particular, referring to FIG. 1, in operation 12, a set of cameras is calibrated to obtain their intrinsic parameters. Intrinsic parameters are necessary to link pixel coordinates of an image point with corresponding coordinates in a camera reference frame. Intrinsic parameters, depending on camera characteristics, may involve estimation of focal length, skew parameter and image center. In contrast, extrinsic parameters define the location and orientation of a camera reference frame with respect to a known world reference frame. Extrinsic parameters, depending on the position of a camera, may involve estimation of rigid body transformation between the sensors.

Next, in operation 14, corner points associated with a planar pattern are extracted. In an embodiment, multiple checkerboard patterns viewable to the set of cameras are disposed in a scene. In another embodiment, the set of cameras observe a planar pattern shown at a few different orientations. Each of the checkboard patterns may be a black and white checkerboard of a size greater than, for example, 4-by-4 squares in a 2-D true color or grayscale image. Alternatively, the checkerboard may include a rectangular board with four notable corner patterns. The checkboard patterns may be attached at walls in the scene. Moreover, the checkboard patterns are presented either in a single shot or multiple shots with respect to the set of cameras. In an embodiment, the checkboard patterns are presented in a single range or camera image per sensor, which is termed "single shot." The distance between the inner checkerboard corners may be determined for resolving the scale ambiguity. In another embodiment, multiple images of a single calibration target are presented at different orientations, which is termed "multiple shots." An image of a single checkerboard disposed in front of, for example, a pair of cameras is taken. The four boundary corner points are recovered in the pair of images.

In operation 16, a vanishing point based on information on the extracted corner points is determined. With recovered 2D positions of the corner points, two parallel lines are constructed by connecting corner points in pairs on the same side of the checkerboard pattern. An intersection of the two parallel lines is determined to be the vanishing point in pixel coordinate. Further, the pixel position is transformed into image coordinate using camera intrinsic parameters and sensor properties.

Subsequently, in operation 18, the set of cameras is adjusted to align their optical axes in parallel with each other based on the vanishing point. In an embodiment, the relative position of each vanishing point is used for adjustment of the set of cameras to be parallel. Difference between the x coordinate and y coordinate in an image plane is used to adjust a pan and a tilt angle of a motor head, respectively. In some embodiments, instead of using a motor head or a motorized pan/tilt head to adjust the camera, a manual adjustment is used.

The method 10 utilizes the relative position of a specific vanishing point for alignment of optical axes of stereo cameras. For cameras with parallel optical axes, the intersection point of parallel lines in a 3D space appears to meet at a common vanishing point in an image plane coordinate.

In some existing approaches, cameras are calibrated and then transformation between the cameras is obtained. The transformation serves as guidance for alignment. Unlike the existing approaches, in the exemplary method 10, the optical axes of a set of stereo cameras are parallel-calibrated by aligning the vanishing point of parallel lines in image pairs. A planar pattern such as a checkerboard pattern is positioned to be viewable for all cameras. Two parallel lines are constructed by detecting the four boundary corner points on the checkerboard. In addition, the location of the intersection point is found in the image. To obtain the corresponding vanishing point, the intersection point in each image is reprojected back to image coordinate in real time using camera intrinsic parameters, which are calculated through automatic camera calibration with multiple checkerboards. The relative position of each vanishing point is used for adjustment of the set of stereo cameras to be parallel.

The method 10 provides a solution which only relies on a checkerboard and cameras. Since no other equipment is required, the method 10 effectively simplifies the alignment process. In addition, the method 10 gives real-time guidance on how to align multiple optical axes. The method 10 is more convenient and efficient than existing approaches that would iteratively adjust two stereo cameras after obtaining a calibration result. In addition, an image area needs to crop during rectification is reduced and thus more information can be retained. Depth information of a target in the image can thereby be recovered more accurately.

Figure 2:
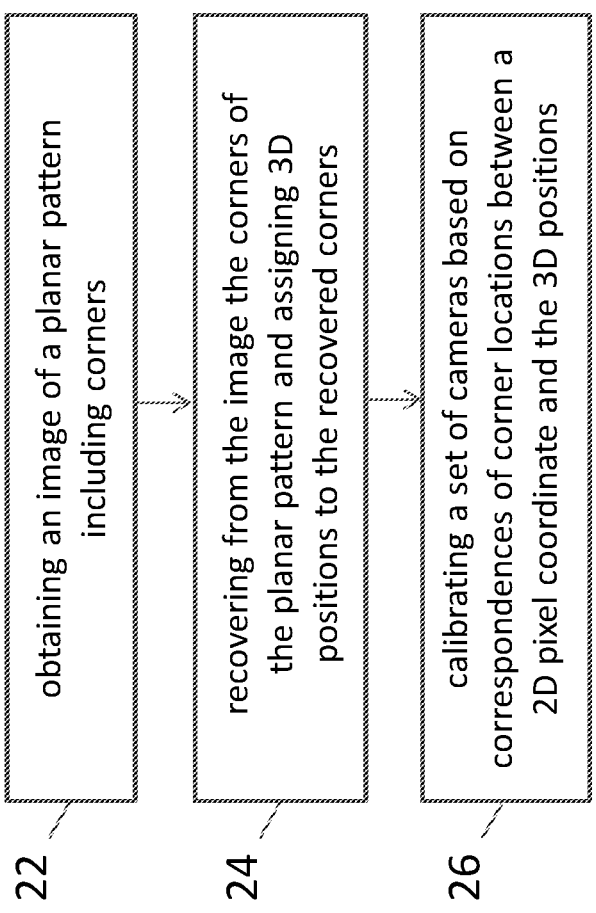
FIG. 2 is a flow diagram showing a method of calibrating cameras, in accordance with an embodiment.

FIG. 2 is a flow diagram showing a method 20 of calibrating cameras, in accordance with an embodiment.

Referring to FIG. 2, in operation 22, an image of a planar pattern including corners is obtained.

Next, in operation 24, the corners of the planar pattern are recovered from the image and then 3D positions are assigned to the recovered corners.

Subsequently, in operation 26, a set of cameras is calibrated based on correspondences of corner locations between a 2D pixel coordinate and the 3D positions.

Figure 3:
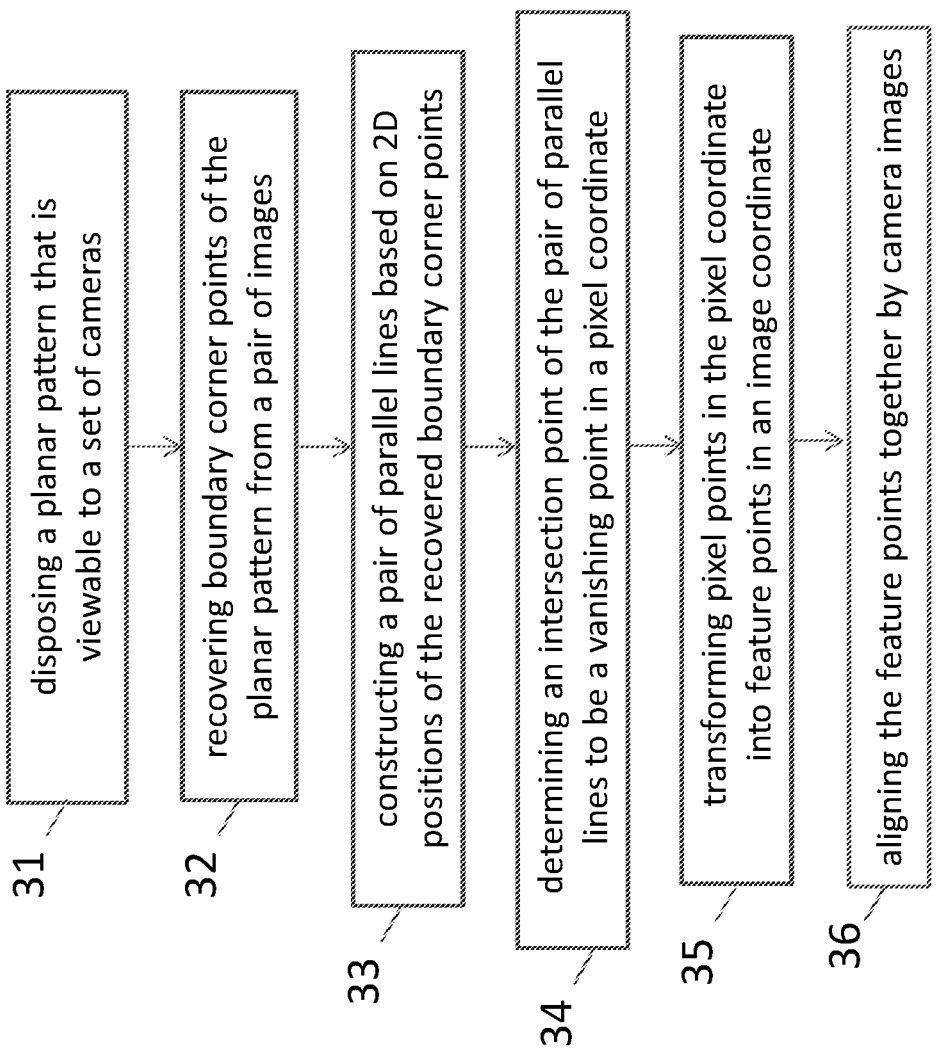
FIG. 3 is a flow diagram showing a method of aligning optical axes of cameras, in accordance with another embodiment.

FIG. 3 is a flow diagram showing a method 30 of aligning optical axes of cameras, in accordance with another embodiment.

Referring to FIG. 3, in operation 31, a planar pattern that is viewable to a set of cameras is disposed in a scene.

In operation 32, boundary corner points of the planar pattern are recovered from a pair of images.

Next, in operation 33, a pair of parallel lines is constructed based on 2D positions of the recovered boundary corner points. Then in operation 34, an intersection point of the pair of parallel lines is determined to be a vanishing point in a pixel coordinate.

In operation 35, pixel points in the pixel coordinate are transformed into feature points in an image coordinate.

Subsequently, in operation 36, aligning the feature points together by camera images. The features may include structured features and unstructured features. The structured features may include, for example, planes, straight lines and curved lines, and the unstructured features may include sparse 3D points.

Figure 4:
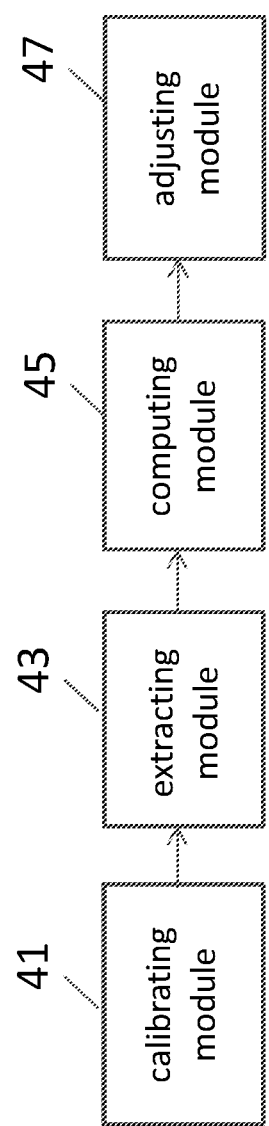
FIG. 4 is a block diagram of a processor in a system for aligning optical axes of cameras, in accordance with an embodiment.

FIG. 4 is a block diagram of a processor 51 in a system for aligning optical axes of cameras, in accordance with an embodiment.

Referring to FIG. 4, the processor 51 includes a calibrating module 41, an extracting module 43, a computing module 45 and an adjusting module 47. Also referring to FIG. 1, the calibrating module 41 is configured to calibrate intrinsic parameters of a set of cameras. The extracting module 43 is configured to extract corner points associated with a planar pattern. The computing module 45 is configured to determine a vanishing point based on information on the extracted corner points. The adjusting module 47 is configured to adjust the set of cameras to align their optical axes in parallel with each other based on the vanishing point.

In addition, also referring to FIG. 2, the calibrating module 41 may be further configured to, in response to an image of a planar pattern including corners, recover from the image the corners of the planar pattern and assign 3D positions to the recovered corners, and calibrate a set of cameras based on correspondences of corner locations between a 2D pixel coordinate and the 3D positions.

FIG. 5 is a block diagram of a system 50 for aligning optical axes of cameras, in accordance with an embodiment.

Referring to FIG. 5, the system 50 includes a processor 51, a computer server 52, a network interface 53, an input and output (I/O) device 55, a storage device 57, a memory 59, and a bus or network 58. The bus 58 couples the network interface 53, the I/O device 55, the storage device 57 and the memory 59 to the processor 51.

Accordingly, the processor 51 is configured to enable the computer server 52, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 51, the computer server 52, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 52 is configured to utilize the I/O port 55 communicate with external devices via a network 58, such as a wireless network. In certain embodiments, the I/O port 55 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 52 is configured to utilize the I/O port 55 to wirelessly communicate with a client device 54, such as a mobile phone, a tablet PC, a portable laptop or any other computing device with internet connectivity. Accordingly, electrical signals are transmitted between the computer server 52 and the client device 54.

In some embodiments in accordance with the present disclosure, the computer server 52 is a virtual server capable of performing any function a regular server has. In certain embodiments, the computer server 52 is another client device of the system 50. In other words, there may not be a centralized host for the system 50, and the client devices 54 in the system are configured to communicate with each other directly. In certain embodiments, such client devices 54 communicate with each other on a peer-to-peer (P2P) basis.

The processor 51 is configured to execute program instructions that include a tool module configured to perform a method as described and illustrated with reference to FIGS. 1 to 3. Accordingly, in an embodiment in accordance with the method 10 illustrated in FIG. 1, the tool module is configured to execute the operations including: calibrating a set of cameras, extracting corner points associated with a planar pattern, computing a vanishing point based on information on the extracted corner points, and adjusting the set of cameras to align their optical axes in parallel with each other based on the vanishing point.

In an embodiment in accordance with the method 20 illustrated in FIG. 2, the tool module is configured to execute the operations including: obtaining an image of a planar pattern including corners, recovering from the image the corners of the planar pattern and assigning 3D positions to the recovered corners, and calibrating a set of cameras based on correspondences of corner locations between a 2D pixel coordinate and the 3D positions.

In an embodiment in accordance with the method 30 illustrated in FIG. 3, the tool module is configured to execute the operations including: disposing a planar pattern that is viewable to a set of cameras, recovering boundary corner points of the planar pattern from a pair of images, constructing a pair of parallel lines based on 2D positions of the recovered boundary corner points, determining an intersection point of the pair of parallel lines to be a vanishing point in a pixel coordinate, transforming pixel points in the pixel coordinate into feature points in an image coordinate, and aligning the feature points together by camera images.

The network interface 53 is configured to access program instructions and data accessed by the program instructions stored remotely through a network (not shown).

The I/O device 55 includes an input device and an output device configured for enabling user interaction with the system 50. In some embodiments, the input device comprises, for example, a keyboard, a mouse, and other devices. Moreover, the output device comprises, for example, a display, a printer, and other devices.

The storage device 57 is configured for storing program instructions and data accessed by the program instructions. In some embodiments, the storage device 57 comprises, for example, a magnetic disk and an optical disk.

The memory 59 is configured to store program instructions to be executed by the processor 51 and data accessed by the program instructions. In some embodiments, the memory 59 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 59 is incorporated into the processor 51.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A method of aligning cameras used for autonomous driving, the method comprising:
   determining intrinsic parameters for a pair of cameras including a first camera and a second camera, wherein the determining the intrinsic parameters comprises obtaining a single image of multiple patterns, disposed at different orientations in a scene, from each of the pair of cameras;
   extracting four corner points from a pair of images of a checkerboard pattern taken by the pair of cameras;
   determining a vanishing point in each of the pair of images in pixel coordinates, based on the extracted corner points, from the intersection of two lines constructed by connecting corner points in pairs on a same side of the checkerboard pattern in the pair of images;
   transforming the pixel coordinates of the vanishing point into feature points in image coordinates using the intrinsic parameters; and
   aligning the pair of images by aligning the feature points in the pair of images.

2. The method according to claim 1, further comprising:
   adjusting the first camera and the second camera to align their optical axes to be parallel to each other based on the vanishing point in each of the pair of images.

3. The method according to claim 1, wherein the determining the intrinsic parameters comprises:
   disposing another pattern at different orientations in the scene; and
   obtaining another image of the other pattern at each of the different orientations from each of the pair of cameras.

4. The method according to claim 1, wherein the determining the intrinsic parameters comprises:
   obtaining an image of a planar pattern including corners;
   recovering from the image the corners of the planar pattern and assigning 3D positions to the recovered corners; and
   calibrating the first camera and the second camera based on correspondences of corner locations between a 2D pixel coordinate and the 3D positions.

5. The method according to claim 1, wherein the determining the vanishing point in each image comprises:
   constructing a pair of parallel lines based on 2D positions of the extracted corner points.

6. A system for aligning cameras in an autonomous driving system, the system comprising:
   a memory;
   one or more processing units; and
   one or more programs stored in the memory configured for execution by the one or more processing units, the one or more programs including instructions to at least:
      determine intrinsic parameters for a pair of cameras including a first camera and a second camera, wherein the determining the intrinsic parameters comprises obtaining a single image of multiple patterns, disposed at different orientations in a scene, from each of the pair of cameras;
      extract four corner points from a pair of images of a checkerboard pattern taken by the pair of cameras;
      determine a vanishing point in each of the pair of images in pixel coordinates, based on the extracted corner points, from the intersection of two lines constructed by connecting corner points in pairs on a same side of the checkerboard pattern in the pair of images;

transform the pixel coordinates of the vanishing point into feature points in image coordinates using the intrinsic parameters; and align the pair of images by aligning the feature points in the pair of images.

7. The system according to claim 6, further comprising:
adjusting the pair of cameras to align their optical axes to be parallel to each other based on the vanishing point in each image.

8. The system according to claim 6, wherein the determining the intrinsic parameters comprises:
disposing another pattern at different orientations in the scene; and
obtaining another image of the other pattern at each of the different orientations.

9. The system according to claim 6, wherein the determining the intrinsic parameters comprises:
obtaining an image of a planar pattern including corners;
recovering from the image the corners of the planar pattern and assigning 3D positions to the recovered corners;
calibrating the first camera and the second camera based on correspondences of corner locations between a 2D pixel coordinate and the 3D positions; and
determining a first set of intrinsic parameters for a first camera and a second set of intrinsic parameters for a second camera, wherein a first set of intrinsic parameters for the first camera link first pixel coordinates of a first image point to corresponding image coordinates in a first camera reference frame and a second set of intrinsic parameters for the second camera link second pixel coordinates of a second image point to corresponding image coordinates in a second camera reference frame.

10. The system according to claim 6, wherein the determining the vanishing point in each image comprises:
constructing a pair of parallel lines including a first line and a second line based on 2D positions of the extracted corner points, wherein the vanishing point in each of the pair of images is determined from the intersection of a first line generated by connecting the corner points on a first side of the pattern and a second line generated by connecting corner points on a second side of the pattern.

11. The method according to claim 1, wherein the vanishing point in each of the pair of images is determined from the intersection of a first line generated by connecting the corner points on a first side of the pattern and a second line generated by connecting corner points on a second side of the pattern.

12. The method according to claim 1, wherein a first set of intrinsic parameters for the first camera link first pixel coordinates of a first image point to corresponding image coordinates in a first camera reference frame and a second set of intrinsic parameters for the second camera link second pixel coordinates of a second image point to corresponding image coordinates in a second camera reference frame.

13. The method according to claim 1, wherein the feature points further include a plane, a straight line, and a sparse point in three dimensions.

14. The system according to claim 6, wherein the feature points further include one or more of a plane, a straight line, or a sparse point in three dimensions.

15. A non-transitory computer readable information recording medium including executable instructions that when executed by at least one processor perform operations comprising:
determining intrinsic parameters for a pair of cameras including a first camera and a second camera, wherein the determining the intrinsic parameters comprises obtaining a single image of multiple patterns, disposed at different orientations in a scene, from each of the pair of cameras;
extracting corner points from a pair of images of a checkerboard pattern taken by the pair of cameras;
determining a vanishing point in each of the pair of images in pixel coordinates, based on the extracted corner points, from the intersection of two lines constructed by connecting corner points in pairs on a same side of the checkerboard pattern in the pair of images;
transforming the pixel coordinates of the vanishing point into feature points in image coordinates using the intrinsic parameters; and
aligning the pair of images by aligning the feature points in the pair of images.

16. The non-transitory computer readable information recording medium according to claim 15, further comprising:
adjusting the first camera and the second camera to align their optical axes to be parallel to each other based on the vanishing point.

17. The non-transitory computer readable information recording medium according to claim 15, wherein the feature points further include a plane, a straight line, and a sparse point in three dimensions.

18. The non-transitory computer readable information recording medium according to claim 15, wherein the determining the intrinsic parameters comprises:
recovering from the image corners of the one or more patterns;
assigning 3D positions to the recovered corners; and
calibrating the pair of cameras based on correspondences of corner locations between a 2D pixel coordinate and a 3D position.

\* \* \* \* \*